(12) United States Patent
Hershberger et al.

(10) Patent No.: US 7,621,481 B2
(45) Date of Patent: Nov. 24, 2009

(54) DECOUPLED STEERING/PLANING AIR VEHICLE NOSE LANDING GEAR

(75) Inventors: Brian Keith Hershberger, Granada Hills, CA (US); David J. Devine, Thousand Oaks, CA (US); Axel Sehic, Canyon County, CA (US)

(73) Assignee: Lockheed-Martin Corporation, Bethesda, MD (US)

( * ) Notice: Subject to any disclaimer, the term of this patent is extended or adjusted under 35 U.S.C. 154(b) by 1103 days.

(21) Appl. No.: 10/933,962

(22) Filed: Sep. 3, 2004

(65) Prior Publication Data

US 2006/0049309 A1     Mar. 9, 2006

(51) Int. Cl.
*B64C 25/10* (2006.01)
*B64C 25/20* (2006.01)

(52) U.S. Cl. .............................. 244/102 A; 244/102 SS

(58) Field of Classification Search ............. 244/100 R, 244/102 R, 102 A, 102 SL, 102 SS, 103 R, 244/104 R, 104 CS, 104 FP, 104 LS, 103 S, 244/103 W See application file for complete search history.

(56) References Cited

U.S. PATENT DOCUMENTS

| | | | | |
|---|---|---|---|---|
| 2,371,699 | A | * | 3/1945 | Martin .................... 244/102 A |
| 2,411,420 | A | * | 11/1946 | Glasgow et al. ......... 244/102 R |
| 2,474,630 | A | * | 6/1949 | Jamison ........................ 244/50 |
| 2,538,388 | A | * | 1/1951 | Sievers ......................... 244/50 |
| 2,982,500 | A | * | 5/1961 | Lucien ..................... 244/102 R |
| 3,133,717 | A | * | 5/1964 | Hartel ..................... 244/103 R |
| 3,285,541 | A | * | 11/1966 | Fehring et al. ................ 244/50 |
| 3,430,896 | A | * | 3/1969 | Labrecque .............. 244/103 R |
| 3,485,464 | A | * | 12/1969 | Oivind .................... 244/102 R |

(Continued)

FOREIGN PATENT DOCUMENTS

FR     1 473 951 A     3/1967

(Continued)

OTHER PUBLICATIONS

European Search Report dated Jan. 23, 2009.

*Primary Examiner*—Rob Swiatek
(74) *Attorney, Agent, or Firm*—Koestner Bertani LLP; Ken Koestner

(57) ABSTRACT

A landing gear assembly comprises a landing gear strut assembly further comprising a landing gear strut having a longitudinal axis and extending from an inboard end to an outboard end capable of attaching to a wheel, and a landing gear housing. The landing gear housing has a longitudinal axis coincident with the landing gear strut longitudinal axis and having an interior chamber capable of accepting a portion of the landing gear strut. The landing gear housing is capable of pivotably coupling to an aircraft. The landing gear assembly further comprises a retraction linkage having an inboard end capable of coupling to the aircraft and an outboard end coupled to the landing gear housing. The retraction linkage is moveable to retract the landing gear strut assembly into an aircraft landing gear compartment about the landing gear housing pivotable aircraft coupling. The landing gear assembly further comprises a steering linkage capable of coupling and decoupling to the landing gear strut and, when coupled, capable of steerably rotating the landing gear strut with respect to the landing gear housing about the coincident longitudinal axis. The landing gear assembly further comprises a planing linkage that can gradually rotate the landing gear strut into a planar position as the landing gear strut assembly is retracted and decoupled from the steering linkage.

18 Claims, 4 Drawing Sheets

U.S. PATENT DOCUMENTS

| | | | |
|---|---|---|---|
| 3,904,153 A * | 9/1975 | Watts | 244/50 |
| 3,954,232 A * | 5/1976 | Harper | 244/102 R |
| 4,088,286 A * | 5/1978 | Masclet et al. | 244/102 SL |
| 4,147,316 A | 4/1979 | Kendall et al. | |
| 4,189,117 A * | 2/1980 | Masclet et al. | 244/102 R |
| 4,199,119 A * | 4/1980 | Masclet | 244/102 SS |
| 4,312,485 A | 1/1982 | Masclet et al. | |
| 4,540,142 A * | 9/1985 | Veaux et al. | 244/102 R |
| 4,556,179 A * | 12/1985 | Veaux et al. | 244/102 R |
| 4,610,411 A | 9/1986 | Veaux et al. | |
| 4,630,788 A * | 12/1986 | Veaux et al. | 244/104 FP |
| 4,659,039 A | 4/1987 | Valdes | |
| 4,770,372 A * | 9/1988 | Ralph | 244/102 R |
| 4,948,069 A * | 8/1990 | Veaux et al. | 244/50 |
| 4,984,755 A | 1/1991 | Derrien | |
| 5,029,775 A * | 7/1991 | Abramovitsh | 244/102 R |
| 5,100,083 A * | 3/1992 | Large et al. | 244/102 SS |
| 5,310,139 A * | 5/1994 | Derrien et al. | 244/104 FP |
| 5,360,185 A | 11/1994 | Derrien | |
| 5,482,228 A * | 1/1996 | Hoshino | 244/50 |
| 5,513,821 A * | 5/1996 | Ralph | 244/50 |
| 5,732,906 A * | 3/1998 | Wong | 244/63 |
| 5,839,692 A | 11/1998 | Ralph et al. | |
| 6,345,564 B1 | 2/2002 | Kilner et al. | |
| 6,367,253 B2 | 4/2002 | Kutlucinar | |
| 6,619,587 B1 * | 9/2003 | Chow et al. | 244/100 R |
| 6,651,931 B1 * | 11/2003 | Fox et al. | 244/104 R |
| 6,824,100 B1 * | 11/2004 | Cheetham | 244/102 R |
| 6,942,182 B2 * | 9/2005 | Quayle | 244/102 R |
| 2003/0102406 A1 * | 6/2003 | Chow et al. | 244/100 R |
| 2005/0082427 A1 * | 4/2005 | Seung | 244/102 R |
| 2006/0032976 A1 * | 2/2006 | Bachmeyer et al. | 244/104 R |

FOREIGN PATENT DOCUMENTS

| | | |
|---|---|---|
| GB | 506 633 A | 5/1939 |

* cited by examiner

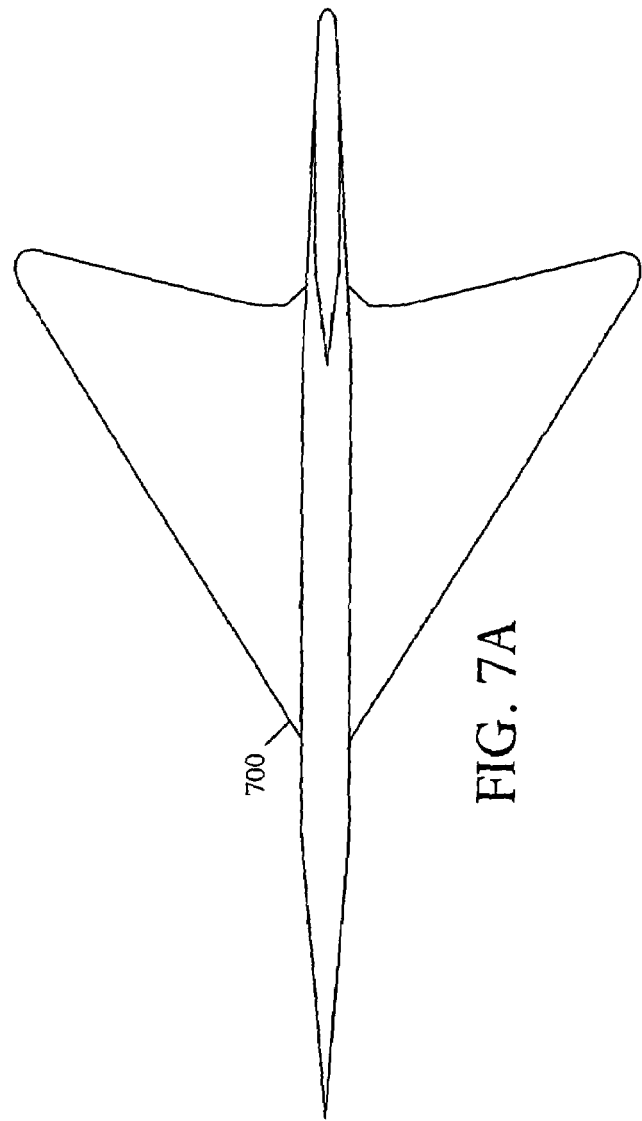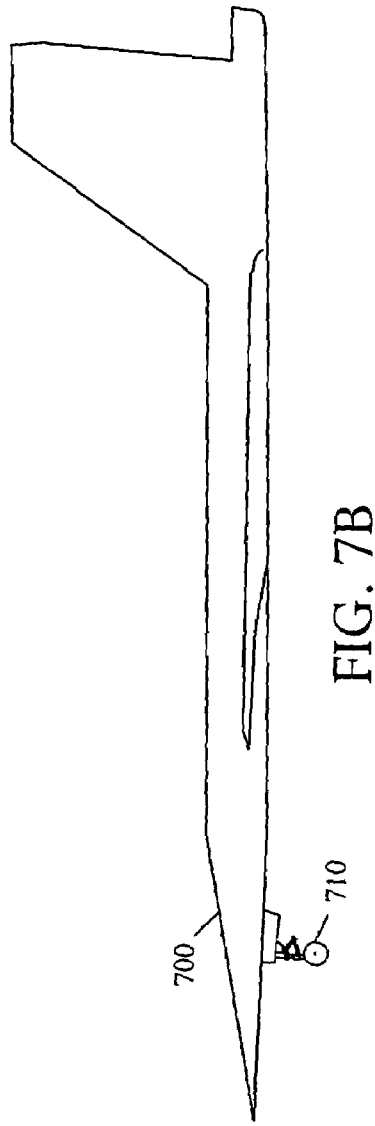
FIG. 7A
FIG. 7B

DECOUPLED STEERING/PLANING AIR VEHICLE NOSE LANDING GEAR

BACKGROUND OF THE INVENTION

Efficient packaging of all subsystems is paramount in present day air vehicles. As a result many landing gear systems use complex, non-planar, drag or retraction linkages to rotate the wheel into a compact orientation that allows for efficient packaging. One example of a system is used on an F-16 aircraft nose landing gear in which a drag brace must rotate about an axis perpendicular to the retraction axis, resulting in non-planar retraction. Other examples are described in U.S. Pat. Nos. 4,984,755 and 3,086,733 that use wheel planing but do not allow steering of the front wheel when extended.

A further example is described in U.S. Pat. No. 2,371,699 ('699) in which the wheel is planed upon retraction and the wheel can be steered when extended. One failure mode of the landing gear shown in '699 is that the actuator can fail either disallowing retraction or, if failure occurs when the gear is stowed, possibly locking or wedging the landing gear inside the landing gear stowage compartment so that the gear cannot be extended.

SUMMARY OF THE INVENTION

In accordance with an embodiment of the present invention, a landing gear assembly comprises a landing gear strut assembly further comprising a landing gear strut having a longitudinal axis and extending from an inboard end to an outboard end capable of attaching to a wheel, and a landing gear housing. The landing gear housing has a longitudinal axis coincident with the landing gear strut longitudinal axis and having an interior chamber capable of accepting a portion of the landing gear strut. The landing gear housing is capable of pivotably coupling to an aircraft. The landing gear assembly further comprises a retraction linkage having an inboard end capable of coupling to the aircraft and an outboard end coupled to the landing gear housing. The retraction linkage is moveable to retract the landing gear strut assembly into an aircraft landing gear compartment about the landing gear housing pivotable aircraft coupling. The landing gear assembly further comprises a steering linkage capable of coupling and decoupling to the landing gear strut when extended and retracted, respectively. When coupled, the steering linkage is capable of steerably rotating the landing gear strut with respect to the landing gear housing about the coincident longitudinal axis. The landing gear assembly further comprises a planing linkage having an inboard end capable of coupling to the aircraft and an outboard end coupled to the landing gear strut. The planing linkage is configured to gradually rotate the landing gear strut into a planar position as the landing gear strut assembly is retracted and decoupled from the steering linkage. Further, the planing linkage is configured to be coincident with the landing gear strut axis of rotation in a fully extended position.

In accordance with another embodiment, an aircraft comprises a fuselage comprising an aircraft landing gear compartment, wings coupled to the fuselage, an aircraft wheel steering mechanism coupled to the fuselage, and a landing gear assembly. The landing gear assembly retracts into a planar configuration and detaches steering capability from the aircraft wheel steering mechanism during retraction.

In accordance with a further embodiment, a method of retracting an aircraft landing gear into a landing gear compartment in the aircraft body comprises initiating aircraft landing gear retraction. The method further comprises retracting an outboard portion of the landing gear from an extended position approximately perpendicular to the aircraft radially toward the landing gear compartment, pivoting from a center point pivotably coupling an inboard portion of the landing gear to the aircraft body. The method further comprises rotating at least a portion of the landing gear about a landing gear central axis to a planar position as the landing gear is retracted, and decoupling a landing gear steering mechanism from the landing gear as the landing gear is retracted.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIGS. 7A and 7B are pictorial diagrams illustrating top and side views, respectively, of an example of an aircraft that can include a steering decoupled/planing nose landing gear.

DETAILED DESCRIPTION

Figure 2:
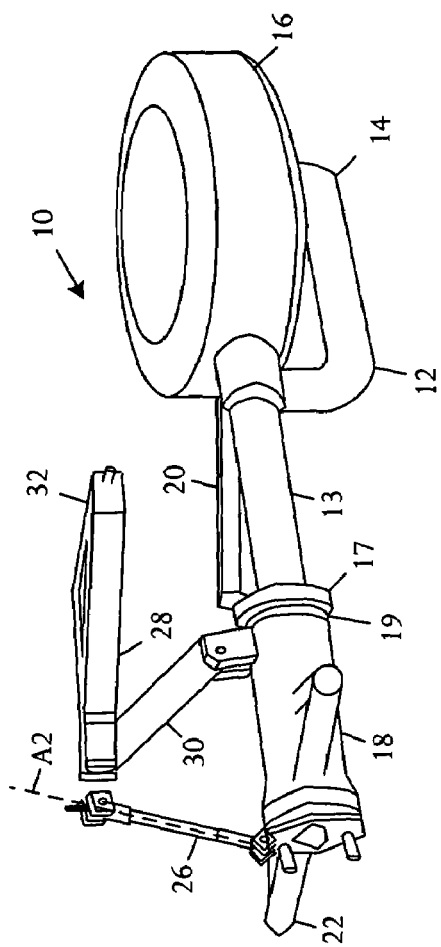
FIG. 2 is an isometric perspective view of the landing gear assembly showing contrasting views of the assembly in a retracted position.

What is desired is a steerable aircraft landing gear that stores compactly when retracted. What is further desired is an aircraft that compactly stores a steerable landing gear.

To address these concerns and desires, a landing gear assembly can have a drag or retract linkage in a planar configuration. Upon retraction, the landing gear assembly decouples aircraft steering control from the landing gear and rotates a wheel assembly through an axis normal to the axis of retraction, a planing angle.

During landing gear retraction, the aircraft landing gear assembly rotates the aircraft wheel about an axis of rotation that is normal to the axis of retraction, enabling a reduced storage volume.

The disclosed landing gear has a retraction mechanism that decouples aircraft steering control from the landing gear strut upon retraction of the strut, preventing steering system failure modes from negatively impacting gear retraction or extension. Also during landing gear retraction, the landing gear assembly rotates the aircraft wheel through an angle having an axis normal to the axis of rotation (planing) using a simple planar linkage. Landing gear extension recouples the aircraft wheel steering mechanism to the landing gear to restore normal steering capabilities when the landing gear is extended.

The illustrative landing gear enables landing gear retraction with wheel planing and concurrent decoupling of the aircraft wheel steering mechanism from the landing gear strut.

In some embodiments, the illustrative aircraft landing gear can physically and functionally disengage the aircraft steering system from the landing gear concurrent with landing gear retraction.

Referring to FIGS. 1 through 5, multiple views show an embodiment of a landing gear assembly 10 that is capable of planing and steering decoupling during retraction. The landing gear assembly 10 comprises a landing gear housing or casing 18 that contains a portion of a landing gear strut 12, and a pivotable retraction linkage 28 for retracting the landing gear assembly 10 into an aircraft. The landing gear strut 12 has an outboard end portion 14 capable of attaching to an aircraft wheel 16 for supporting an aircraft on the ground, and an inboard end portion 13 that inserts into the landing gear housing 18. The landing gear strut 12 and aircraft wheel 16 rotate within the landing gear housing 18 about a rotational axis A3. The inboard end portion 13 of the landing gear strut 12 is held in the landing gear housing 18 and is mounted for axial movement into and out of the landing gear housing 18. Typically, the landing gear assembly 10 incorporates various embodiments of damping or shock absorption into functionality of the landing gear housing 18, the landing gear strut 12, or both. The landing gear housing 18 has an outboard end 17 from which the landing gear strut 12 extends. The outboard end 17 of the landing gear housing 18 includes a rotatable collar 19 that is fastened to the landing gear housing 18 although capable of rotating about the axis A3 with respect to the remainder of the landing gear housing 18. A hinged linkage 20 couples the landing gear strut 12 to the rotatable collar 19 of the landing gear housing 18 while allowing extension and retraction of part of the landing gear strut 12 into the landing gear housing 18.

Figure 1:
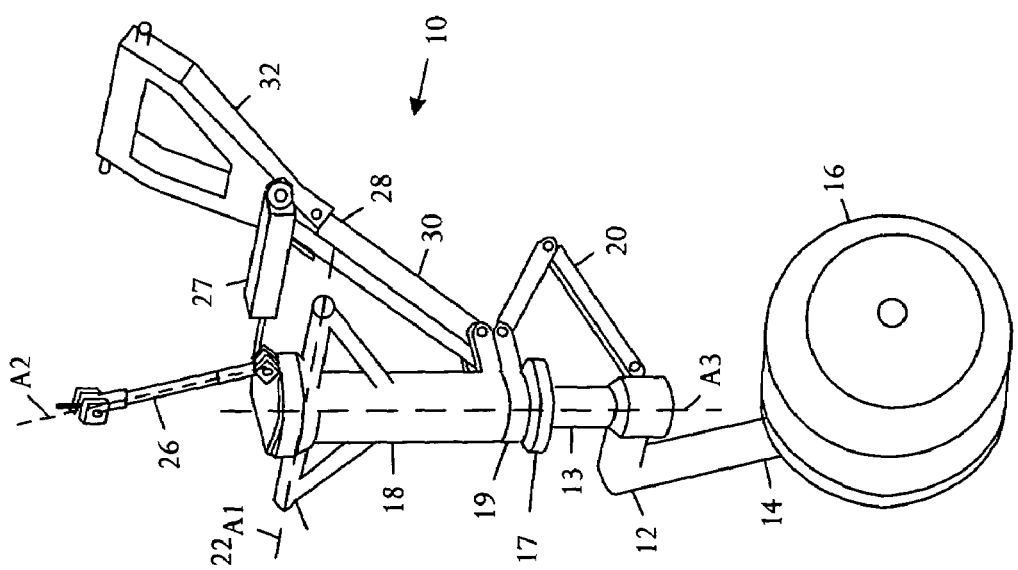
FIG. 1 is an isometric perspective view of a landing gear assembly shown in an extended position.

Referring to FIG. 1, when the landing gear assembly 10 is in an extended position, the functional position in that the aircraft wheel 16 is in contact with the ground, the hinged linkage 20 is folded. A substantial part of the inboard end portion 13 of the landing gear strut 12 is contained within the landing gear housing 18.

Referring to FIG. 2, when the landing gear assembly 10 is in a retracted position, a nonfunctional position since the landing gear assembly 10 is not functioning to support the aircraft, the aircraft wheel 16 is off the ground. In the nonfunctional position, the landing gear assembly 10 is typically stowed within a landing gear compartment of the aircraft. The landing gear strut 12 extends from the landing gear housing 18 to an extension limit and the hinged linkage 20 unfolds to a straighter configuration.

Figure 5:
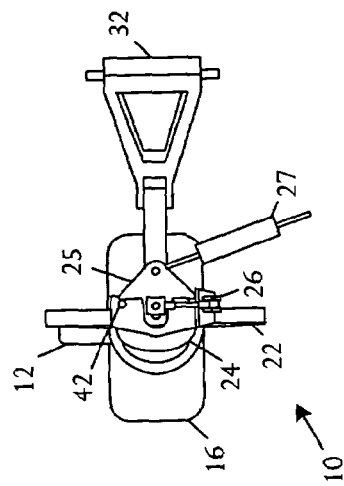
FIG. 5 is a top view showing the landing gear assembly.
Figure 4:
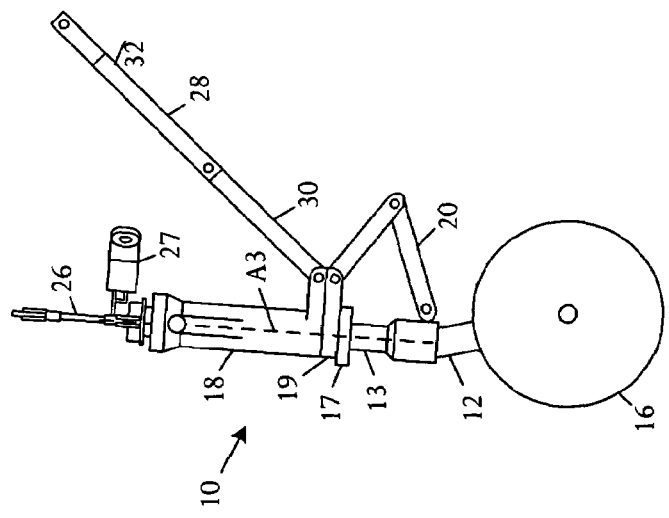
FIG. 4 is a side view of the landing gear assembly.
Figure 3:
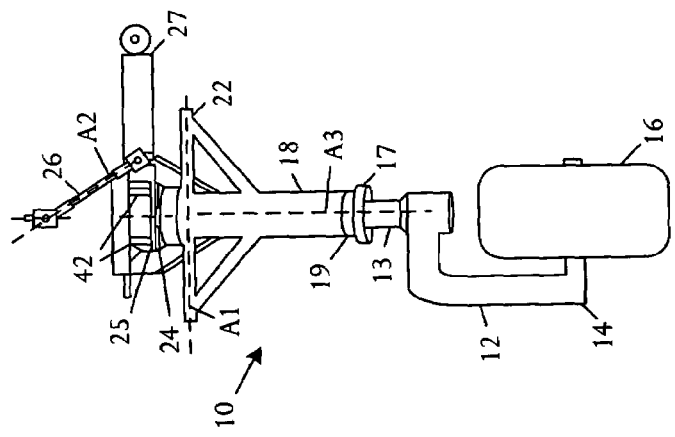
FIG. 3 is a frontal view of the landing gear assembly.

Referring to FIGS. 3-5, a pivot bar 22 is coupled to the landing gear housing 18 at an inboardmost housing position in the vicinity of the connection of the landing gear assembly 10 to the aircraft. The pivot bar 22 defines a first pivot axis A1. A first planar axial element 24 is connected to the inboard end portion 13 of the landing gear strut 12. The first planar axial element 24 is associated and coupled to the landing gear housing 18. A planing linkage 26 is coupled to the first planar axial element 24 at the outboard location and is connected to the aircraft at the inboard location. The inboard location of the planing linkage 26 defines an axis A2 for rotating the landing gear strut 12 during retraction and extension. The axis of symmetry A2 is coincident with the axis A3 of the landing gear strut 12 and the landing gear housing 18 when the landing gear assembly 10 is extended. A second planar axial element 25 faces the first planar axial element 24 and mounts to a wheel steering mechanism 27. The second planar axial element 25 is associated and coupled to the aircraft wheel steering mechanism 27.

In some embodiments, the first planar axial element 24 and the second planar axial element 25 are configured as parallel plates that are stacked vertically in a parallel alignment in the horizontal plane when the aircraft is on the ground or in substantially horizontal flight with the landing gear assembly 10 extended.

Figure 6:
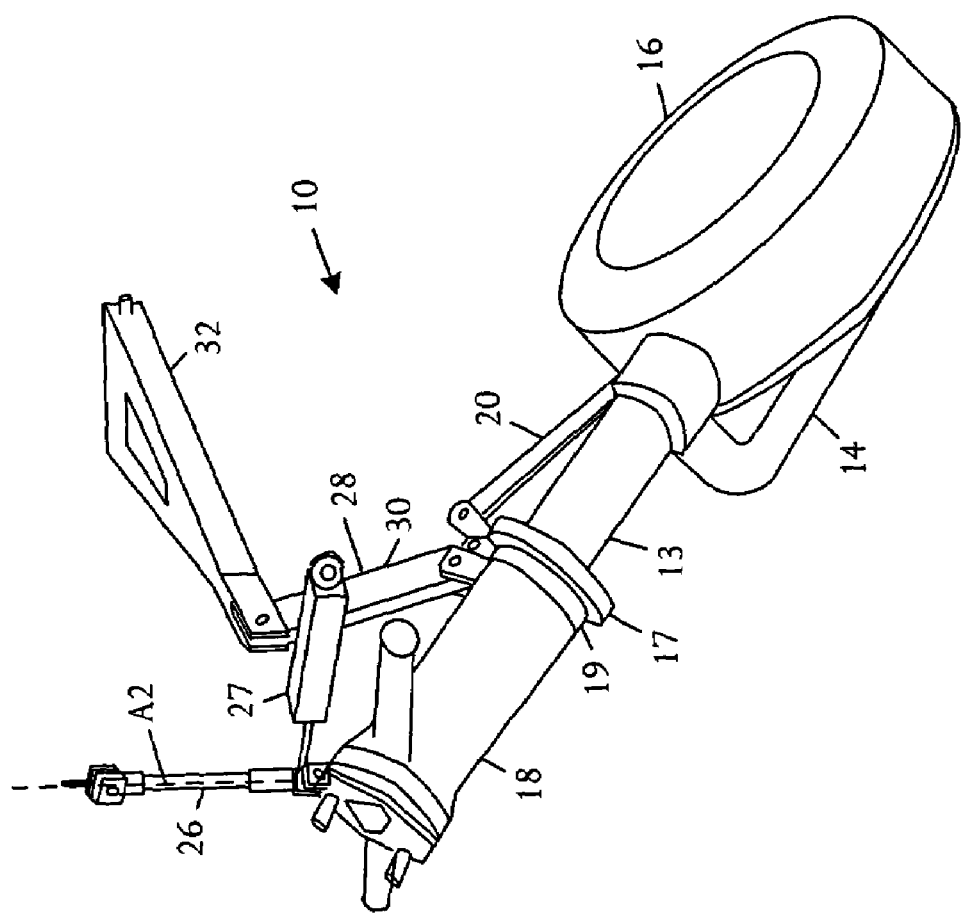
FIG. 6 is a pictorial isometric perspective view of a landing gear assembly shown in a position in movement from extension from retraction.

The pivotable retraction linkage 28 is coupled in the vicinity of the outboardmost end of the landing gear housing 18. The pivotable retraction linkage 28 has a shaft portion 30 mounted to the landing gear housing 18 and a handle portion 32 extending upwardly into a landing gear storage compartment in the aircraft for connection to an aircraft and a landing gear retraction assembly capable of retracting and extending the landing gear. Referring to FIG. 6, upon actuation of a landing gear retraction mechanism in the aircraft, the pivotable retraction linkage 28 is drawn upwardly into the landing gear storage compartment, pivoting the landing gear assembly 10 about the axis A1. As the landing gear assembly 10 retracts the landing gear strut 12 pivots about the axis A3, being driven by the planar axial element 24 which is attached to and constrained by the planing linkage 26 which pivots about axis A2 rotating the landing gear strut 12 and the aircraft wheel 16 into a planar configuration. In the planar configuration, the aircraft wheel 16 is arranged parallel to the ground. Typically, the aircraft wheel 16 has a diameter that is larger than the wheel's width so that arranging the aircraft wheel 16 in a planar configuration enables a reduction in size of the landing gear storage compartment of the aircraft.

Referring to FIG. 5, a top view of the landing gear assembly 10 shows structures in the assembly 10 that interconnect with the steering mechanism 27. When the landing gear assembly 10 retracts into the aircraft landing gear storage compartment, the aircraft wheel steering mechanism decouples from the landing gear assembly 10. The aircraft wheel steering mechanism 27 interacts and imparts steering motion to the landing gear assembly 10 by varying the orientation of the second planar axial element 25 which maintains sliding contact with the first planar axial element 24 through roller pins 42 mounted to the first planar axial element 24. When the landing gear assembly 10 begins retraction, the roller pins 42 associated with the planar axial element 24 disengage from axial element 25, freeing the first planar axial element 24 associated with the landing gear assembly 10 for movement independent of the second planar axial element 25 associated with the wheel steering mechanism 27. Disengagement enables the landing gear strut 12 and aircraft wheel 16 to be pivoted about the axis A3 independent of to the aircraft wheel steering mechanism 27.

In the final retracted position of the landing gear assembly 10, the landing gear housing 18 is disposed substantially normal to the aircraft wheel steering mechanism 27 and is completely decoupled from the wheel steering mechanism 27.

In the fully extended position of the landing gear assembly 10, the aircraft wheel steering mechanism 27 is coupled to the inboard end portion 13 of the landing gear strut 12 via first planar axial element 24 and the associated roller pins 42. In the extended position, the landing gear strut 12 and the planing linkage 26 are free to rotate about coincident axes A2 and A3. The aircraft wheel steering mechanism 27 steers the landing gear assembly 10 by imparting a moment about the second planar axial element 25 through the contacting roller pins 42 which are thereby attached to the first planar axial element 24.

On initiation of landing gear assembly retraction, the landing gear strut 12 rotates about the axis A3 and the first and second planar axial elements 24 and 25 disengage, decoupling the aircraft wheel steering mechanism 27 from the roller pins 42. Concurrently, the planing linkage 26 constrains movement of the landing gear strut 12 to the plane normal to axis A1, imparting a rotational moment to the landing gear strut 12. The rotational moment causes the landing gear strut 12 to rotate inside the landing gear housing 18 while the landing gear assembly 10 is retracted into the aircraft landing gear storage compartment. In the illustrative embodiment, the aircraft wheel 16 assembly rotates through an axis normal to the axis of retraction.

The aircraft wheel steering mechanism 27 can be any suitable device. In some embodiments, the aircraft wheel steering mechanism can be a four-bar linkage mechanism, for example using a single actuator to generate suitable steering motion via multiple pin joints. Other types of steering mechanisms can alternatively be used.

Referring to FIGS. 7A and 7B, pictorial diagrams illustrate top and side views of an example of an aircraft 700 that can include a steering decoupled/planing nose landing gear 710. The aircraft 700 has limited space for a compartment for storing the landing gear 710 so that planing of the gear is useful to limit the vertical dimension of the gear when stowed. Decoupling of steering when the landing gear 710 is raised avoids failure that could otherwise occur, possibly resulting in rotation of the gear inside the storage compartment, wedging of the landing gear 710 inside the storage compartment, causing failure to extend the gear.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the invention. Variations and modifications of the embodiments disclosed herein may be made based on the description set forth herein, without departing from the scope and spirit of the invention as set forth in the following claims.

In the claims, unless otherwise indicated the article "a" is to refer to "one or more than one".

What is claimed is:

1. A landing gear assembly comprising:
    a landing gear strut assembly comprising:
    a landing gear strut having a longitudinal axis and extending from an inboard end to an outboard end configured to attach to a wheel; and
    a landing gear housing having a longitudinal axis that is coincident with the landing gear strut longitudinal axis and having an interior chamber configured to accept a portion of the landing gear strut, the landing gear housing configured for pivotable coupling to an aircraft;
    a retraction linkage having an inboard end configured to couple to the aircraft and an outboard end coupled to the landing gear housing, the retraction linkage being moveable to retract the landing gear strut assembly into an aircraft landing gear compartment about the pivotable coupling;
    a steering linkage configured to couple and decouple to the landing gear strut and, when coupled, configured to steerably rotate the landing gear strut with respect to the landing gear housing about the landing gear strut longitudinal axis and decoupling from the landing gear strut in a fully retracted position, wherein the steering linkage further comprises:
        a first planar axial element associated with the landing gear strut assembly and a second planar axial element associated with an aircraft wheel steering mechanism, the first and second planar axial elements being in parallel alignment and configured for mutual rotation about a central axis; and
        roller pins mounted to the first planar axial element, the roller pins disengaging from the second planar axial element when the landing gear strut assembly is retracted, freeing the first planar axial element for movement independent of the second planar axial element; and
    a planing linkage having a longitudinal axis that is coincident with the central axis when extended, the planing linkage being configured to gradually rotate the landing gear strut into a planar position as the landing gear strut assembly is retracted.

2. The landing gear assembly according to claim 1 wherein the steering linkage further comprises:
    the landing gear strut during landing gear assembly retraction being configured for rotation about the planing linkage longitudinal axis mutually disengaging the first and second planar axial elements and decoupling an aircraft wheel steering mechanism from the roller pins; and
    the planing linkage coupled to the first planar axial element and constraining landing gear strut movement during retraction to a rotational moment that rotates the landing gear strut to a planar configuration.

3. The landing gear assembly according to claim 1 further comprising:
    a hinged linkage that couples the landing gear strut to the landing gear housing.

4. The landing gear assembly according to claim 1 further comprising:
    a collar coupled to the landing gear housing and configured for rotation about the landing gear strut longitudinal axis; and
    a hinged linkage that couples the landing gear strut to the landing gear housing, the hinged linkage moving to a planar configuration on retraction.

5. The landing gear assembly according to claim 1 wherein the retraction linkage further comprises:
    a shaft portion mounted to the landing gear housing;
    a handle portion extending upwardly into the aircraft landing gear compartment for connection to the aircraft and the retraction linkage configured to retract and extend the landing gear; and
    a hinge coupling the shaft portion and the handle portion.

6. The landing gear assembly according to claim 1 wherein the retraction linkage further comprises:
    a shaft portion mounted to the landing gear housing;
    a handle portion extending upwardly into the aircraft landing gear compartment for connection to the aircraft and the retraction linkage configured to retract and extend the landing gear; and
    a hinge coupling the shaft portion and the handle portion wherein upon actuation of an aircraft landing gear mechanism the retraction linkage is drawn upwardly into the aircraft landing gear compartment, pivoting the landing gear strut assembly about the planing linkage longitudinal axis into a planar configuration.

7. A landing gear assembly comprising:
    a landing gear strut having a longitudinal axis and extending from an inboard end to an outboard end configured to attach to a wheel; and
    a landing gear housing having a longitudinal axis that is coincident with the landing gear strut longitudinal axis and having an interior chamber configured for accepting a portion of the landing gear strut, the landing gear housing including a pivotable couple configured to pivotably couple the landing gear housing to an aircraft;

a retraction linkage having an inboard end configured to couple to the aircraft and an outboard end coupled to the landing gear housing, the retraction linkage being moveable to retract the landing gear strut into an aircraft landing gear compartment about the landing gear housing pivotable couple;

a steering linkage configured to couple and decouple to the landing gear strut and, when coupled, to steerably rotate the landing gear strut with respect to the landing gear housing about the landing gear strut longitudinal axis and decoupling from the landing gear strut in a fully retracted position; and a planing linkage having a longitudinal axis that is coincident with a landing gear strut steering axis when extended, the planing linkage being configured to gradually rotate the landing gear strut into a planar position as the landing gear strut is retracted, the steering linkage further comprises:

first and second planar axial elements in parallel alignment and configured for mutual rotation about the landing gear strut steering axis;

roller pins mounted to the first planar axial element, the landing gear strut during landing gear assembly retraction being configured for rotation about the planing linkage longitudinal axis mutually disengaging the first and second planar axial elements and decoupling an aircraft wheel steering mechanism from the roller pins; and the planing linkage coupled to the first planar axial element and constraining landing gear strut movement during retraction to a rotational moment that rotates the landing gear strut to a planar configuration.

8. The landing gear assembly according to claim 7 further comprising:
a hinged linkage that couples the landing gear strut to the landing gear housing.

9. The landing gear assembly according to claim 7 further comprising:
a collar coupled to the landing gear housing and configured for rotation about the landing gear strut longitudinal axis; and
a hinged linkage that couples the landing gear strut to the landing gear housing, the hinged linkage moving to a planar configuration on retraction.

10. The landing gear assembly according to claim 7 wherein the retraction linkage further comprises:
a shaft portion mounted to the landing gear housing;
a handle portion extending upwardly into the aircraft landing gear compartment to connect to the aircraft and the retraction linkage configured to retract and extend an aircraft landing gear; and
a hinge coupling the shaft portion and the handle portion.

11. The landing gear assembly according to claim 7 wherein the retraction linkage further comprises:
a shaft portion mounted to the landing gear housing;
a handle portion extending upwardly into the aircraft landing gear compartment for connection to the aircraft and the retraction linkage configured to retract and extend an aircraft landing gear; and
a hinge coupling the shaft portion and the handle portion wherein upon actuation of an aircraft landing gear mechanism the retraction linkage is drawn upwardly into the aircraft landing gear compartment, pivoting the landing gear strut about the planing linkage longitudinal axis into a planar configuration.

12. A landing gear assembly comprising:
a steering linkage configured to couple and decouple to a landing gear strut and, when coupled, configured to steerably rotate the landing gear strut with respect to a landing gear housing about a longitudinal axis of the landing gear strut and decoupling from the landing gear strut in a fully retracted position, the steering linkage further comprising:

a first planar axial element associated with the landing gear strut and second planar axial element associated with an aircraft wheel steering mechanism, the first and second planar axial elements being in parallel alignment and configured for mutual rotation about a central axis; and roller pins mounted to the first planar axial element, the roller pins disengaging from the second planar axial element when the landing gear strut is retracted freeing the first planar axial element for movement independent of the second planar axial element; and a planing linkage having a longitudinal axis that is coincident with the central axis when extended, the planing linkage being configured to gradually rotate the landing gear strut into a planar position as the landing gear strut is retracted.

13. The landing gear assembly according to claim 12 further comprising:
a hinged linkage that couples the landing gear strut to the landing gear housing.

14. The landing gear assembly according to claim 12 further comprising:
a collar coupled to the landing gear housing and being configured for rotation about the longitudinal axis of the landing gear strut with respect to the landing gear housing; and
a hinged linkage that couples the landing gear strut to the landing gear housing, the hinged linkage moving to a planar configuration on retraction.

15. The landing gear assembly according to claim 12 further comprising:
a retraction linkage having an inboard end configured for coupling to an aircraft and an outboard end coupled to the landing gear housing, the retraction linkage being moveable to retract the landing gear strut into an aircraft landing gear compartment about a pivotable coupling of the landing gear housing to the aircraft, the retraction linkage further comprising:
a shaft portion mounted to the landing gear housing;
a handle portion extending upwardly into the aircraft landing gear compartment for connection to an aircraft and the retraction linkage configured to retract and extend an aircraft landing gear; and
a hinge coupling the shaft portion and the handle portion.

16. The landing gear assembly according to claim 12 further comprising:
a retraction linkage having an inboard end configured for coupling to an aircraft and an outboard end coupled to the landing gear housing, the retraction linkage being moveable to retract the landing gear strut into an aircraft landing gear compartment about a pivotable coupling of the landing gear housing to the aircraft, the retraction linkage further comprising:
a shaft portion mounted to the landing gear housing;
a handle portion extending upwardly into the aircraft landing gear compartment for connection to an aircraft and the retraction linkage configured to retract and extend an aircraft landing gear; and a hinge coupling the shaft portion and the handle portion wherein upon actuation of an aircraft landing gear mechanism the retraction linkage is drawn upwardly into the aircraft landing gear compartment, pivoting the landing gear strut assembly about the planing linkage longitudinal axis into a planar configuration.

17. The landing gear assembly according to claim 12 further comprising:

a landing gear strut having a longitudinal axis and extending from an inboard end to an outboard end configured to attach to a wheel; and a landing gear housing having a longitudinal axis that is coincident with the landing gear strut longitudinal axis and having an interior chamber configured for accepting a portion of the landing gear strut, the landing gear housing being configured for pivotably coupling to an aircraft; and a retraction linkage having an inboard end configured to couple to the aircraft and an outboard end coupled to the landing gear housing, the retraction linkage being moveable to retract the landing gear strut assembly into an aircraft landing gear compartment about the landing gear housing pivotable aircraft coupling.

18. The landing gear assembly according to claim 12 further comprising:

a retraction linkage having an inboard end configured to couple to an aircraft and an outboard end coupled to the landing gear housing, the retraction linkage being moveable to retract the landing gear strut assembly into an aircraft landing gear compartment about a pivotable coupling of the landing gear housing to the aircraft.

* * * * *

UNITED STATES PATENT AND TRADEMARK OFFICE
CERTIFICATE OF CORRECTION

PATENT NO. : 7,621,481 B2  Page 1 of 1
APPLICATION NO. : 10/933962
DATED : November 24, 2009
INVENTOR(S) : Hershberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 805 days.

Signed and Sealed this

Fourteenth Day of December, 2010

David J. Kappos
*Director of the United States Patent and Trademark Office*